United States Patent [19]
Chang

[11] Patent Number: 5,371,923
[45] Date of Patent: Dec. 13, 1994

[54] HANDLE FOR A BAGGAGE CART

[76] Inventor: Fu J. Chang, 8-5 Fl., No. 191, Fu Hsing N. Rd., Taipei, Taiwan, Prov. of China

[21] Appl. No.: 100,990

[22] Filed: Aug. 4, 1993

[51] Int. Cl.$^5$ ............................................. B25G 1/04
[52] U.S. Cl. ..................................... 16/115; 403/109; 280/655
[58] Field of Search ................ 190/18 A; 403/109 X, 403/377; 280/47.315, 47.371, 655, 655.1; D16/115

[56]    References Cited
U.S. PATENT DOCUMENTS

| | | | |
|---|---|---|---|
| 2,334,057 | 11/1943 | Ashton | 16/115 |
| 5,002,304 | 3/1991 | Carrigan | 280/655 |
| 5,195,803 | 3/1993 | Quintile | 403/109 |

Primary Examiner—P. Austin Bradley
Assistant Examiner—Chuck Y. Mah
Attorney, Agent, or Firm—McCubbrey, Bartels & Ward

[57]    ABSTRACT

A handle of a telescopic handle assembly for a baggage cart includes at least a handle seat fixedly connected to an inner tube of the telescopic handle assembly, an actuator rotatably received within a mounting hole of the handle seat, a grip portion formed by an assembly of two grip members with semi-circular peripheries and being fixedly connected to the actuator so that a rotation of the grip portion can rotate the actuator, and an operating block which has at least a portion being forcedly in contact with a portion of the actuator so that a rotation of the actuator can cause a lifting movement of the operating block from a position to a selected position. The operating block is fixedly connected to a locking means for locking the inner tube with an outer tube of the telescopic handle assembly. Once the operating block is lifted to the selected position, the locking of the locking means for locking the inner tube with the outer tube is unlocked.

3 Claims, 3 Drawing Sheets

HANDLE FOR A BAGGAGE CART

BACKGROUND OF THE INVENTION

The present invention relates to a handle for a baggage cart, and, more particularly, to a handle rotatable to unlock the inner tubes from the outer tubes of the handle assembly for a baggage cart.

Telescopic handle assemblies are widely used in various types of baggage carts for carriage of travelers' baggage. When such a baggage cart is used to transport baggage, the user draws inner tubes of the telescopic handle assembly from outer tubes to a locking position, by pulling a handle fixedly connected to the inner tubes. When the baggage cart is not used, the inner tube are unlocked from the locking position and compressed into the outer tubes in order to let the baggage cart have a more compact volume. A conventional design for unlocking the inner tubes from the locking position is that the user must either bow his body to use one of his hands to push down an operating lever to activate a locking means to release the locking, or lift the baggage cart with one of his hands and push down the operating level with the other hand. Such a conventional design is not convenient to operate. Another conventional design is to equip an operating bar located about and substantially parallel to the handle. The operating bar has a length substantially equal to that of the handle. When the operating bar is forced to move toward the handle by gripping of the user's hand(s), it activates the locking means to release the locking of the inner tubes. However, such a conventional design is not convenient for a person to grip the handle, particularly for a person who has thick palms, since the space between the handle and the operating bar is limited.

SUMMARY OF THE INVENTION

To overcome the disadvantages of the conventional designs, the present invention is proposed to have a unique rotatable handle which can unlock the inner tubes from the outer tubes of the telescopic handle assembly for a baggage cart. The present invention comprises a handle seat fixedly connected to one of the inner tube and being provided with a mounting hole, an actuator rotatably received within the mounting hole of the handle seat, said actuator being provided with an actuating surface and being rotatable between a first position and a second position, a grip portion fixedly connected to the actuator and rotatable to rotate the actuator relative to the handle seat, and an operating block provided with an actuated surface forcedly in contact with the actuating surface of the actuator and movable to a third position following the rotation of the actuator to the first position to lock the locking means to lock the inner tube with the outer tube, and to a fourth position following the rotation of the actuator to the second position to unlock the locking means to unlock the inner tube from the outer tube.

The present invention provides a rotatable handle which can be easily operated to unlock a locking means which locks the inner tubes with the outer tubes of the handle assembly for a baggage cart.

It is an object of the present invention to provide a rotatable handle which can release the locking of the inner tubes from the outer tubes of the handle assembly for a baggage cart.

It is a further object of the present invention to provide a rotatable handle which can be easily and conveniently operated to release the locking of the handle assembly for a baggage cart.

Other objects, advantages, and novel features of the invention will become more apparent from the following detailed description when taken in conjunction with the accompanying drawings.

DETAILED DESCRIPTION THE PREFERRED EMBODIMENTS

Figure 1:
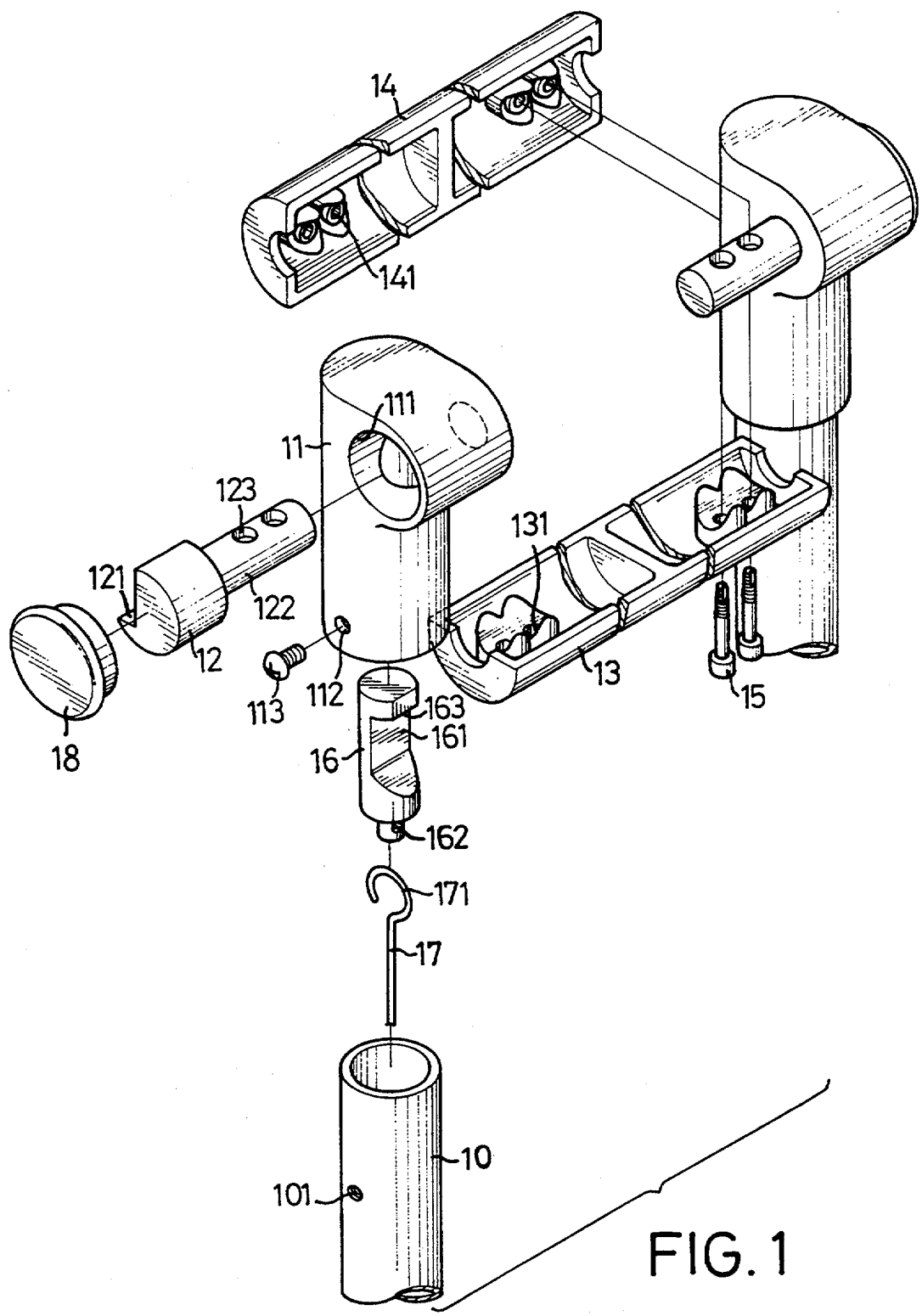
FIG. 1 is a perspective exploded view showing the elements constituting the present invention.

Please refer to FIG. 1 which shows the elements constituting the present invention. The present handle includes at least a handle seat 11 with a mounting hole 111 and a hole 112, a screw 113, an upper grip member 14 being configurated to have a semi-circular periphery and being provided with threaded holes 141, an lower grip member 13 also being configurated to have a semi-circular periphery and being provided with assembly holes 131, an actuator 12 having an actuating surface 121 and a rod portion 122 with assembly holes 123, a protective cap 18, threaded bolts 15, and an operating block 16 having a connecting hole 162 and an actuated surface 161 with an upper edge 163. The screw 113 is used to fixedly secure the handle seat 11 to an inner tube 10 by passing the screw 113 through the hole 112 of the handle seat 11 and threadedly engaging with a threaded hole 101 of the inner tube 10. The connecting hole 162 is used to fixedly connect the operating block 16 with a connecting wire 17 by passing a hook 171 of the connecting wire 17 through said connecting hole 162.

Figure 2:
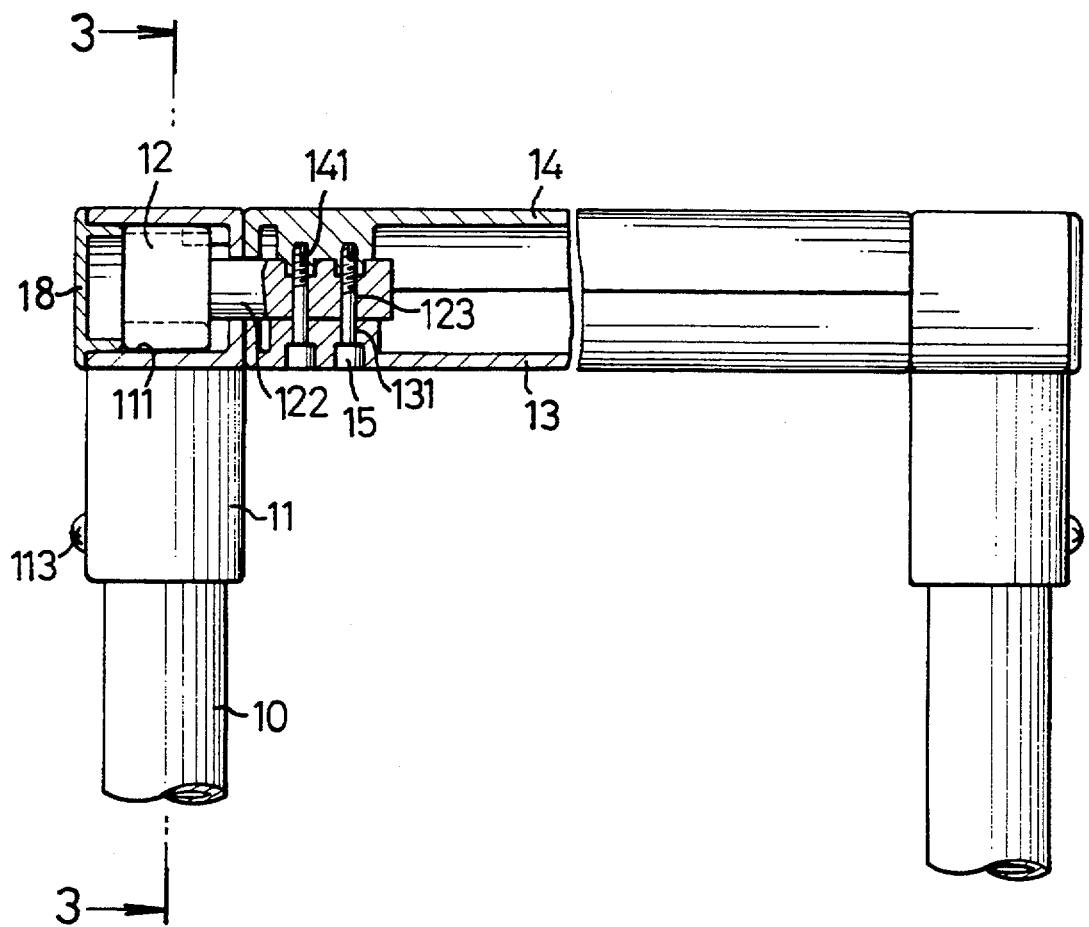
FIG. 2 is a side view, partly in cross section, showing the present invention assembled.

Now please refer to FIG. 2 which shows the present handle assembled. The actuator 12 is rotatably received within the mounting hole 111 of the handle seat 11, while the rod portion 122 thereof protrudes into a circular space formed between the upper grip member 14 and lower grip member 13 when the two grip members 13, 14 are assembled together. The two grip members are each configurated to have a semicircular periphery; thus, after they are assembled, they form a grip portion with a circular periphery for the user to grip thereon with his or her hand(s). The threaded bolts 15 pass through the assembly holes 131 of the lower grip member 13 and the assembly holes 123 of the rod portion 122 of the actuator 12, and threadedly engage with the threaded holes 141 of the upper grip member 14 to fixedly connect the lower grip member 13, the actuator 12, and the upper grip member 14 together, whereby when the user rotates the grip portion formed by the grip members 13 and 14, the actuator 12 will be rotated accordingly. The protective cap 18 is installed into the left end of mounting hole 111.

Figure 3:
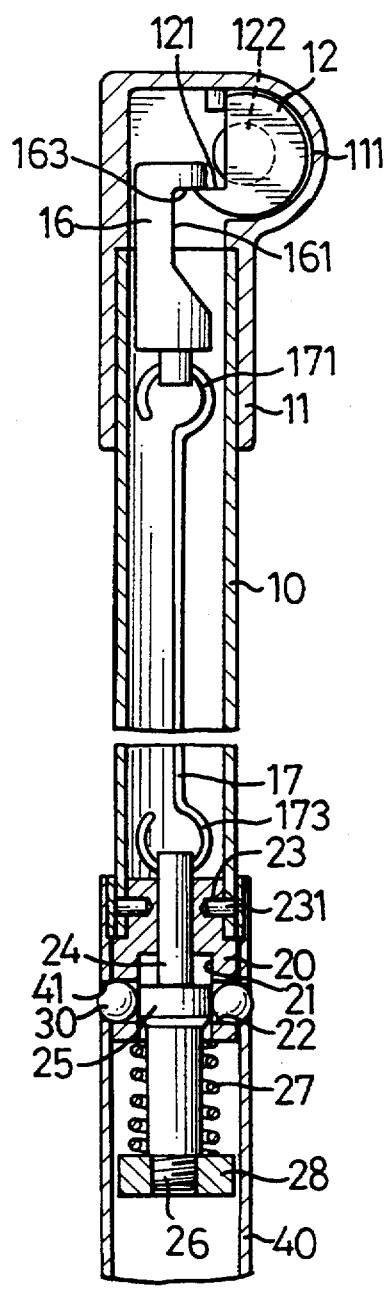
FIG. 3 is a cross-sectional end view taken from the line 3—3 of FIG. 2 showing that an inner tube is locked with an outer tube by means of steel balls in engagements of locking holes formed in the outer tube.

Now please refer to FIG. 3 which shows the inner tube 10 locked with an outer tube 40 by a fixed engagement between steel balls 30 and locking holes 41 formed in the outer tube 40. Parts of the steel balls 30 are received within the holes 22 formed in an operating sleeve 20. The operating sleeve 20 is fixedly connected to the inner tube 10 by pins 231 which pass through holes formed in the lower end of the inner tube 10 and fixedly engage with the holes 23 formed on an upper portion of the operating sleeve 20. A plunger 24, which has a part movably mounted within a recess 21 of the operating sleeve 20, is fixedly connected to the connecting wire 17 by passing a hook 173 of the connecting wire 17 through a hole formed on the top end of the plunger 24. Thus, the plunger 24 will move following the movement of the connecting wire 17 which in turn is connected to the operating block 16. The plunger 24 has a flange surface 25, which, as show by FIG. 3, contacts the steel balls 30 and forces the steel balls 30 to enter the holes 41 of the outer tube 40 and fixedly engage therewith. On the lower end of the plunger 24, there is provided with a threaded portion 26 which is threadedly engaged with a stop 28. Between the stop 28 and the bottom surface of operating sleeve 20, there is provided a spring 27 compressed therebetween. The actuating surface 121 of the actuator 12 is forcedly in contact with the upper edge 163 of the actuated surface 161 of the actuator 16 by a spring force of the spring 27 acting on the operating block 16 through the stop 28, the plunger 24 and the connecting wire 17.

Figure 4:
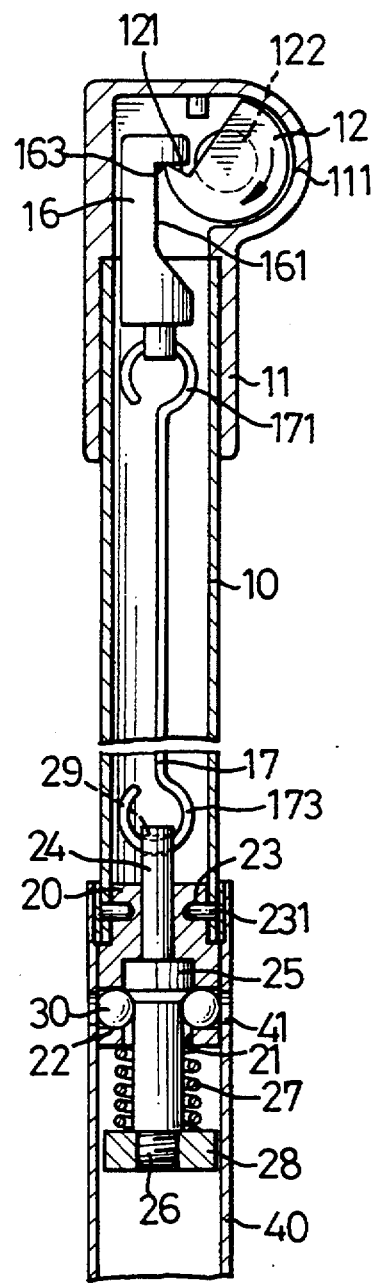
FIG. 4 is a view similar to FIG. 4 but showing that the handle is rotated to activate the locking means to release the locking situation shown in FIG. 3.

Now please refer to FIG. 4. When the grip portion formed by the assembly of the upper grip member 14 and the lower grip member 13 is rotated by the hand(s) of the user in a direction as shown by the arrow, the actuator 12 will be rotated accordingly since the actuator 12 is fixedly connected to grip portion as mentioned above. As shown by FIG. 4, the rotation of actuator 12 causes the position of the operating block 16 to be lifted a distance from the position shown in FIG. 3. The lift of the operating block 16 results in that the engagement of the inner tube 10 with the outer tube 40 is released since the plunger 24, which is fixed connected to the operating block 16, is also lifted. The lift of the plunger 14 causes the flange surface 25 to no longer contact the steel balls 30 and force the steel balls 30 to enter the holes 41 of outer tube 40. Once the fixed engagement between the steels balls 30 and the holes 41 of the outer tube 40 is released, the user can compress the inner tube 10 into the outer tube 40 by pushing the grip portion formed by the assembled upper grip member 14 and the lower grip member 13.

Although the invention has been explained in relation to its preferred embodiment, it is to be understood that many other possible modifications and variations can be made without departing from the spirit and scope of the invention as hereinafter claimed.

I claim:

1. A handle of a telescopic handle assembly for a baggage cart, the handle assembly having at least one inner tube telescopically received within at least one outer tube and a locking means for locking the inner tube with the outer tube, the locking means being fixedly attached to the inner tube and being able to be shifted between a locking mode and a released mode, the handle comprising;
    a handle seat fixedly connected to the inner tube and being provided with a mounting hole;
    an actuator rotatably received within the mounting hole of the handle seat, said actuator being provided with an actuating surface and being rotatable between a first position and a second position;
    a grip portion fixedly connected to the actuator and being rotatable to rotate the actuator relative to the handle seat;
    an operating block provided with an actuated surface forcedly in contact with the actuating surface of the actuator and movable to a third position following the rotation of the actuator to the first position, and to a fourth position following the rotation of the actuator to the second position; and
    a connecting means fixedly connecting the operating block and the locking means;
    whereby, when the operating block is moved to the third position, the locking means is shifted to the locking mode to lock the inner tube with the outer tube, and, when the operating block is moved to the fourth position, the locking means is shifted to the released mode to unlock the inner tube from the outer tube.

2. A handle according to claim 1, wherein the grip portion is formed by the assembly of two grip members respectively configurated to have a semi-circular periphery, thereby to form the grip portion to have a circular periphery.

3. A handle according to claim 1, wherein the grip portion is formed by the assembly of a first grip member and a second grip member, each grip member having a semi-circular periphery, the first grip member having at least one hole formed therethrough and the second grip member having at least one threaded hole formed thereon, the actuator being integrated with a rod with at least one hole formed therethrough, the actuator fixedly connected to the two grip members by passing at least one threaded bolt through the hole of the first grip member and then the hole of the rod, and, finally threadedly engaging the threaded portion of the threaded bolt with the threaded hole of the second grip member.

* * * * *